United States Patent

Falcone et al.

[11] Patent Number: 6,080,486
[45] Date of Patent: Jun. 27, 2000

[54] FLUOROPOLYETHER TOPCOAT LUBRICANTS

[75] Inventors: Samuel J. Falcone, San Jose; Bruno J. Marchon, Palo Alto, both of Calif.

[73] Assignee: Seagate Technology, Inc., Scotts Valley, Calif.

[21] Appl. No.: 09/055,265

[22] Filed: Apr. 6, 1998

Related U.S. Application Data

[60] Provisional application No. 60/050,345, Jun. 20, 1997.

[51] Int. Cl.[7] .................................................. G11B 5/725
[52] U.S. Cl. ..................................... 428/421; 428/694 TF
[58] Field of Search ............................... 428/694 TF, 421

[56] References Cited

U.S. PATENT DOCUMENTS

| | | | |
|---|---|---|---|
| 4,786,544 | 11/1988 | Saito | 428/143 |
| 5,082,714 | 1/1992 | Yanai et al. | 428/141 |
| 5,431,833 | 7/1995 | Kondo et al. | 252/54.006 |
| 5,506,309 | 4/1996 | Bierschenk et al. | 525/410 |
| 5,539,059 | 7/1996 | Bierschenk et al. | 525/331.6 |

OTHER PUBLICATIONS

"Handbook of Lubrication and Tribology", T. Del Pesco, 1994, vol. III, pp. 287–303.

*Primary Examiner*—Stevan A. Resan
*Attorney, Agent, or Firm*—McDermott, Will & Emery

[57] ABSTRACT

A fluoropolyether alcohol is applied to form a lubricant topcoat on a magnetic recording medium. Suitable alcohols include fluoropolyethers having more than one carbon atom per repeating unit.

8 Claims, 8 Drawing Sheets

$^{19}$F NMR of fluoropoly(ethylene glycol) diol

Fractionation results of fluoropoly(ethylene glycol) diol compared to commercial Zdol.

FLUOROPOLYETHER TOPCOAT LUBRICANTS

RELATED APPLICATIONS

This application claims priority from provisional patent application Ser. No. 60/050,345, filed Jun. 20, 1997, the entire disclosure of which is hereby incorporated herein by reference.

TECHNICAL FIELD

The present invention relates to the recording, storage and reading of magnetic data, particularly rotatable magnetic recording media, such as thin film magnetic disks having textured surfaces and a lubricant topcoat for contact with cooperating magnetic transducer heads.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

A typical longitudinal recording medium is depicted in FIG. 1 and comprises a substrate 10, typically an aluminum (Al)-alloy, such as an aluminum-magnesium (Al-Mg)-alloy, plated with a layer of amorphous nickel-phosphorus (NiP). Alternative substrates include glass, glass-ceramic materials and graphite. Substrate 10 typically contains sequentially deposited on each side thereof a chromium (Cr) or Cr-alloy underlayer 11, 11', a cobalt (Co)-base alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective overcoat 13, 13', typically containing carbon, are usually deposited by sputtering techniques performed in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective layer to prevent wear between the disk and head interface during drive operation. Excessive wear of the protective overcoat, typically comprising carbon, increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A significant factor in the performance of a lubricant topcoat is the amount of lubricant which tightly adheres to the magnetic recording media. The amount of adhering lubricant is described by the "bonded lube ratio" which is the ratio of the amount of lubricant directly bonded to the magnetic recording media vis-à-vis the total amount of originally applied lubricant. The portion of lubricant which is not tightly bound and easily removed by immersion of the recording media in a solvent is referred to as the "mobile lubricant".

Another significant factor in the performance of a lubricant topcoat is the ability of the lubricant to resist decomposition over time, particularly decomposition by acid catalysis. For example, lubricants that resist catalytic cleavage by Lewis acids provide improved tribology under stress conditions.

Despite the importance of lubricity in recording media, few commercial lubricants are available that satisfy the demanding criteria of a lubricant topcoat. Typical conventional lubricants, such as perfluoroalkylpolyether fluids such as PFPE-1, PFPE-2, PFPE-3, PFPE-4, do not have polar end-groups which would permit lube bonding or a high bonded lube ratio. Significantly, many conventional lubricants contain difluoroformyl ($-CF_2O-$) linkages, i.e. repeating units with only one carbon atom, throughout the main chain of the polymer. It is know that formyl and difluoroformyl linkages undergo acid catalyzed cleavage resulting in decomposition of the polymeric chain over time. (see e.g. T. Del Pesco Handbook of Lubrication and Tribology (1994) Vol. III pages 287–303, Booser, E.R. ed., CRC Press, Boca Raton, FL). Thus, it is believed that lubricants with formyl or halosubstituted formyl linkages compromise the integrity of the lubricant over time resulting in poor performance.

Two commercially available lubricants with functional end-groups are ZDOL® (Ausimont USA, Thorofare, N.J.) and Demnum SA (Nagase &Co., LTD.). These compounds have the following chemical structure:

ZDOL® $HOCH_2CF_2O\ (CF_2CF_2O)_a\ (CF_2O)_b CF_2CH_2OH$

Demnum SA F $(CF_2CF_2CF_2O)_c CF_2CF_2CH_2OH$

However, ZDOL® contains difluoroformyl linkages which suffers from the same deficiencies described above and Demnum SA has only one polar end group. Moreover, neither lubricant exhibits a sufficiently high bonded lube ratio preferable for a lubricant topcoat.

The degree of direct bonding or bonded lube ratio is dependent upon the particular material employed for the protective overcoat and the lubricant end-group. Desirably, the bonded lube ratio should be controllable to realize a meaningful improvement in stiction and wear performance of the resulting magnetic recording medium.

In view of the criticality of the lubricant topcoat, there is a continuing need for improved bonding of the lubricant to the magnetic recording media, particularly to a protective carbon overcoat. There is also a need for lubricants for use as topcoats in the manufacture of recording media with improved resistance to degradation and improved tribology under stress conditions.

DISCLOSURE OF THE INVENTION

An object of the present invention is a magnetic recording medium comprising a lubricant topcoat bonded thereto at a high bonded lube ratio.

Another object of the present invention is a method of manufacturing a magnetic recording medium comprising a lubricant topcoat having a high bonded lube ratio.

Additional objects, advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a magnetic recording medium comprising a lubricant topcoat, wherein the lubricant is a fluoropolyether alcohol having more than one carbon atom per repeating unit.

Another aspect of the present invention is a lubricant comprising a fluoropolyether alcohol having the formula:

$$HOCH_2CF_2O(R^1O)_x(R^2O)_y(R^3O)_zA;$$

wherein
R$^1$ is C$_{2-10}$ fluoroalkyl, or C$_{2-10}$ perfluoroalkyl;
R$^2$ and R$^3$ comprise at least two carbon atoms and are the same or different alkyl, substituted alkyl, fluoroalkyl, perfluoroalkyl, aryl, substituted aryl, fluoroaryl, or perfluoroaryl group;
A is H, —CF$_2$CH$_2$OH, or —CF$_2$COOCH$_3$;
x is between about 5 to about 500; and
y and z are independently 0 or up to about 100.

A further aspect of the present invention is a method of producing a fluoropolyether alcohol having more than one carbon atom per repeat unit, which method comprises the steps of:

(a) protecting a hydrocarbon polyether comprising at least five C$_{2-10}$ alkyl repeating groups and having at least one hydroxyl end group by reacting the hydrocarbon polyether with a carboxylic acid chloride to form a polyether ester;

(b) exposing the polyether ester to fluorine gas for a sufficient time and in a sufficient amount of the fluorine gas to fluorinate the polyether ester to produce a fluoropolyether ester;

(c) adding an alcohol to the fluoropolyether ester to generate a second fluoropolyether ester; and (d) reducing the second fluoropolyether methylester with a reducing agent to generate a fluoropolyether alcohol.

Additional objects and advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
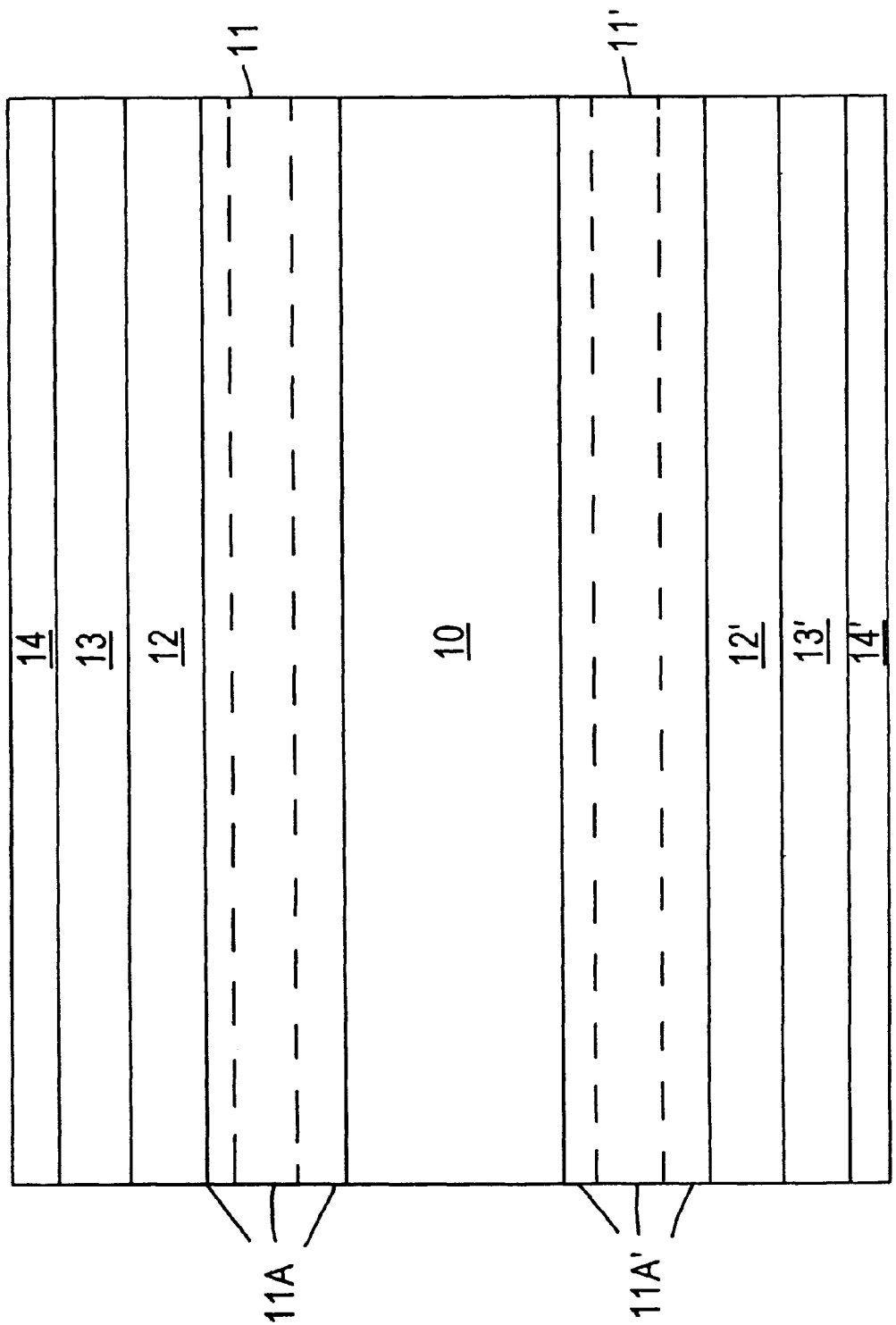
FIG. 1 schematically depicts a magnetic recording medium structure to which the present invention is applicable.

The present invention stems from the discovery that certain fluoropolyether alcohols having more than one carbon atom per repeating unit, when used as lubricant topcoats, lead to unexpected and considerable improvements in the performance of magnetic media.

The present invention is directed to a class of lubricants which can be advantageously employed as lubricant topcoats on magnetic recording media with a controlled degree of direct bonding to the magnetic recording media, especially to a protective overcoat. The lubricants of the present invention can be bonded in a controlled manner to various protective overcoat materials, including carbon, silicon dioxide, hydrogenated carbon, nitrogenated carbon, or graphitic carbon. A particularly advantageous characteristic of the inventive class of lubricants is that it can be tailored to achieve a controlled bonded lube ratio. Consequently, the inventive class of lubricants can be applied to various protective topcoat materials with a controlled bonded lube ratio and attendant reduction in stiction but an increase in wear resistance and durability.

The lubricant topcoats according to the present invention comprise fluoropolyether alcohols having at least one hydroxy terminal group. The fluoropolyether alcohols of the present invention have more than one carbon atom per repeating unit, i.e. each repeating unit of the polymer chain has two, three, four, or more carbon atoms between any oxygen atom in the main chain of the polymer backbone. Alternatively stated, the fluoropolyether alcohols of the present invention do not have formyl (—CH$_2$O—) or halo-substituted formyl linkages (—CX$_2$O—, wherein X is fluorine, chlorine, bromine, or iodine) in the main chain of the polymer.

Fluoropolyether alcohols of the present invention include homopolymers, random polymers or block polymers, i.e. the repeating units may be the same or different. Furthermore, different repeating units may be randomly distributed along the backbone of the polymer or the different repeating units may be distributed as a block of one type of repeating unit and subsequent blocks of different repeating units along the backbone of the polymer. The fluoropolyether alcohols may be completely fluorinated or partially fluorinated and may be linear or branched. Fluoropolyether alcohols of the forgoing have the formula:

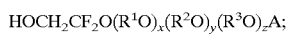

$HOCH_2CF_2O(R^1O)_x(R^2O)_y(R^3O)_zA$;

wherein $R^1$ comprises a fluoroalkyl, or perfluoroalkyl group with two to ten carbon atoms;

$R^2$ and $R^3$ comprise at least two carbon atoms and can be the same or different alkyl, substituted alkyl, fluoroalkyl, perfluoroalkyl, aryl, substituted aryl, fluoroaryl, or perfluoroaryl groups;

A is H, —$CF_2CH_2OH$, or —$CF_2COOCH_3$;

x is has a value between about 5 to about 500; and y and z are independently 0 or up to about 100. More preferable, x is between about 15 to about 100.

An embodiment of the of the fluoropolyether alcohols of the present invention comprise compounds of the formula:

$HOCH_2CF_2O(R^1O)_xA$;

wherein $R^1$ is $C_{2-10}$ fluoroalkyl, or $C_{2-10}$ perfluoroalkyl;
A is H, —$CF_2CH_2OH$, or —$CF_2COOCH_3$; and
x is between about 5 to about 500.

A preferred embodiment of the fluoropolyether alcohol comprises a perfluorinated compound of the formula:

$HOCH_2CF_2O(CF_2CF_2O)_n CF_2CH_2OH$;

wherein n is about 10 to about 100.

Preferably, the fluoropolyether has an average molecular weight of about 500 to about 10,000 a.m.u., more preferably about 2,000 to about 5,000 a.m.u.

Fluoropolyethers with a narrow molecular weight distribution are more preferable. The molecular weight distribution can be measured by a variety of conventional techniques including Gel Permeation Chromatography (GPC). The molecular weight distribution of a polymer is determined by the ratio of the weight average (Mw) to number average (Mn) molecular weight of a given polymer. The Mw/Mn value of a given polymer is referred to as its polydispersity index.

Preferably, the fluoropolyether has a polydispersity index of about 1 to about 1.5, more preferred less than about 1.2, and most preferably less than about 1.1.

The lubricant topcoat of the present invention can be applied to a magnetic recording medium, either on the magnetic layer or on a conventionally applied protective overcoat, particularly a carbon overcoat. In an embodiment of the present invention, the lubricant is dissolved in a conventional hydrofluorocarbon solvent, such as PF-5060 (3M Corp.), HFE-7100 (3M Corp.), Freon TA®, Vertrel-XF (Dupont) or AK-225 (AGA Chemical Asahiklin), in a ratio of about 0.0001% to about 100% by (weight/weight), preferably about 0.0005% to about 0.5%, more preferably about 0.001% to about 0.01%.

A typical magnetic recording medium, for example, a composite comprising a non-magnetic substrate having sequentially deposited on each side thereof an underlayer, a magnetic layer, and a protective carbon overcoat, is submerged in the lubricant solution and then slowly withdrawn therefrom. In practicing the present invention, one can employ a conventional lifter-type dipper to submerge the composite in the lubricant solution. One having ordinary skill in the art can easily optimize the duration of submergence and the speed of withdrawal to achieve a desired coating thickness.

Figure 4:
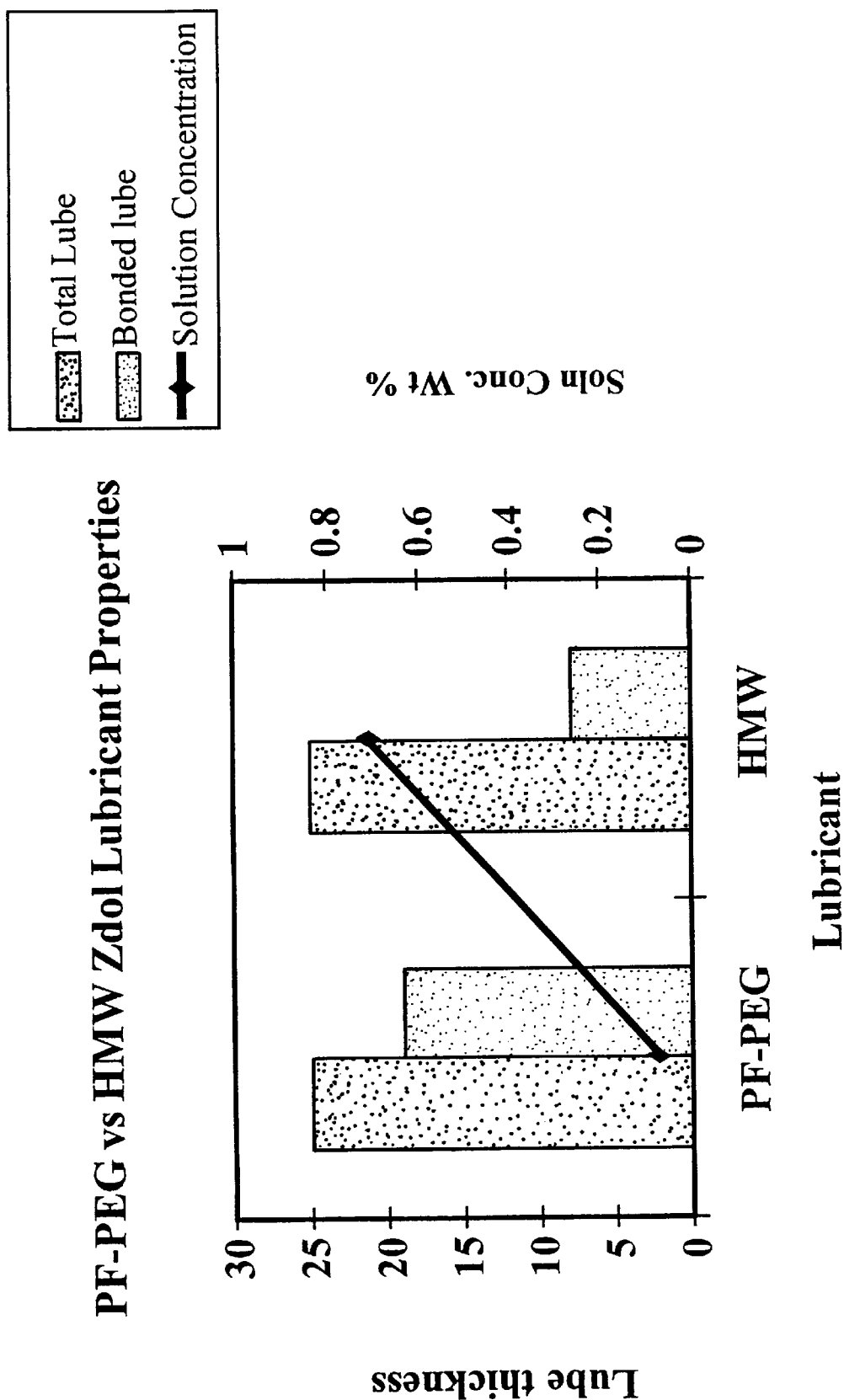
FIG. 4 comparatively demonstrates the bonded lube ratio which can be achieved with embodiments of the present invention vis-à-vis conventional lubricants.
Figure 5:
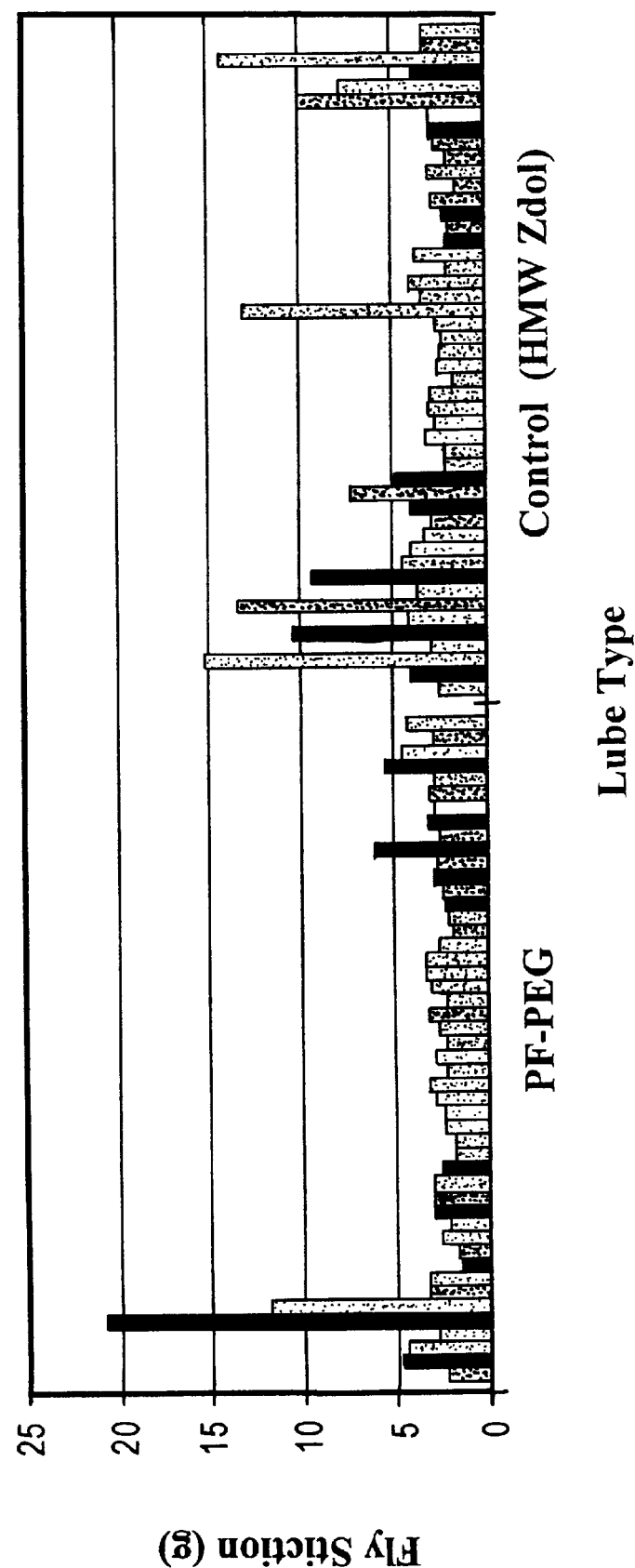
FIG. 5 comparatively demonstrates the fly stiction which can be achieved with embodiments of the present invention vis-à-vis conventional lubricants.
Figure 6:
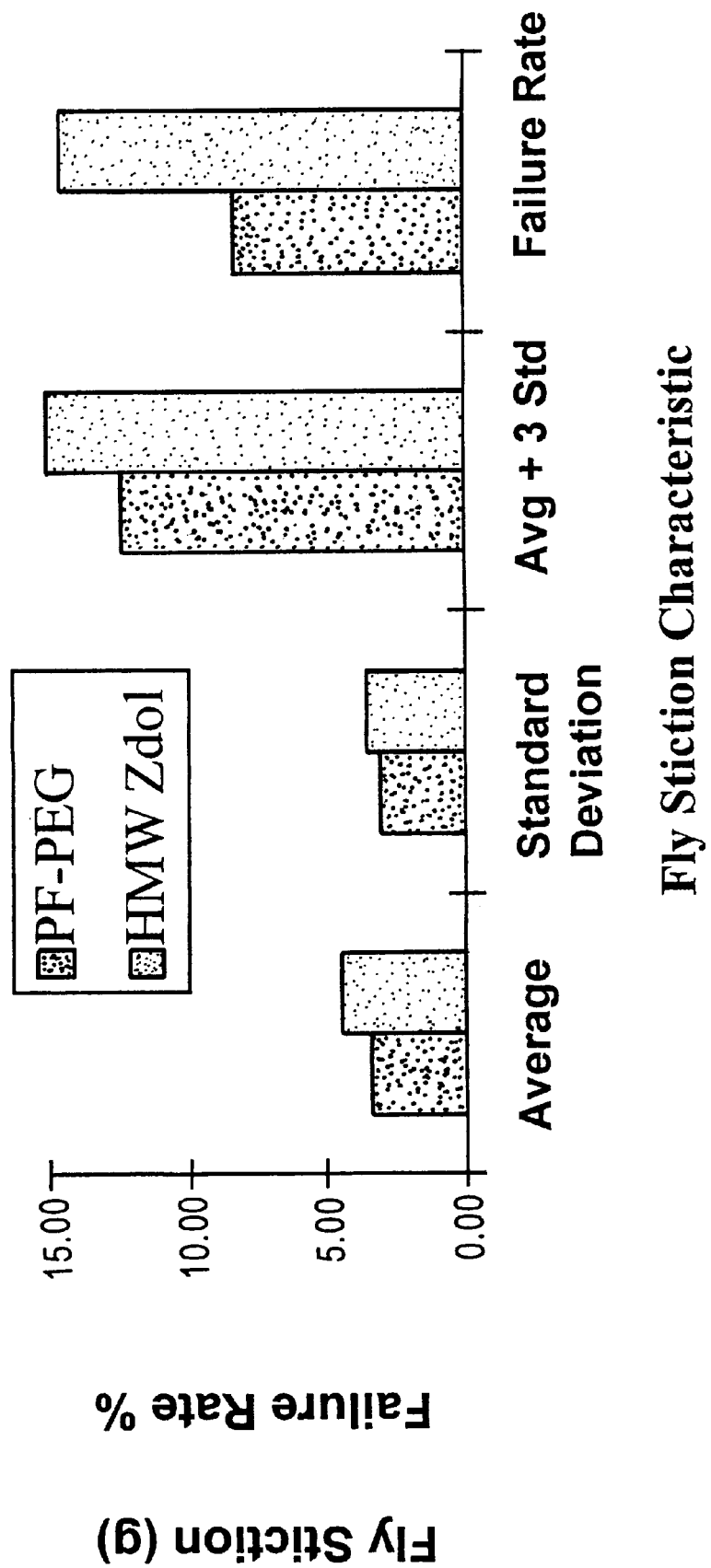
FIG. 6 summarizes the results of FIG. 5.
Figure 7:
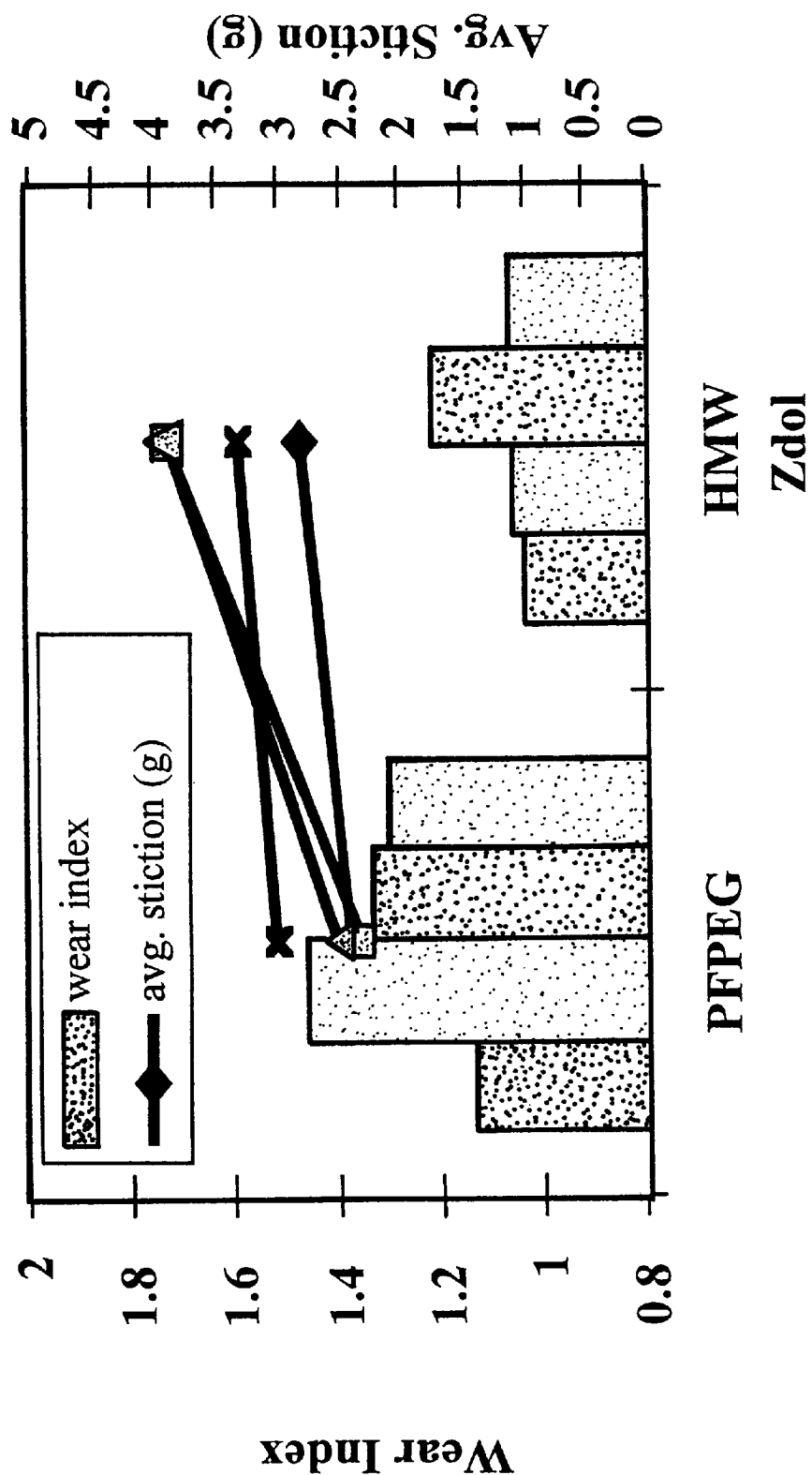
FIGS. 7 and 8 comparatively demonstrates the CSS data which can be achieved with embodiments of the present invention vis-à-vis conventional lubricants.
Figure 8:
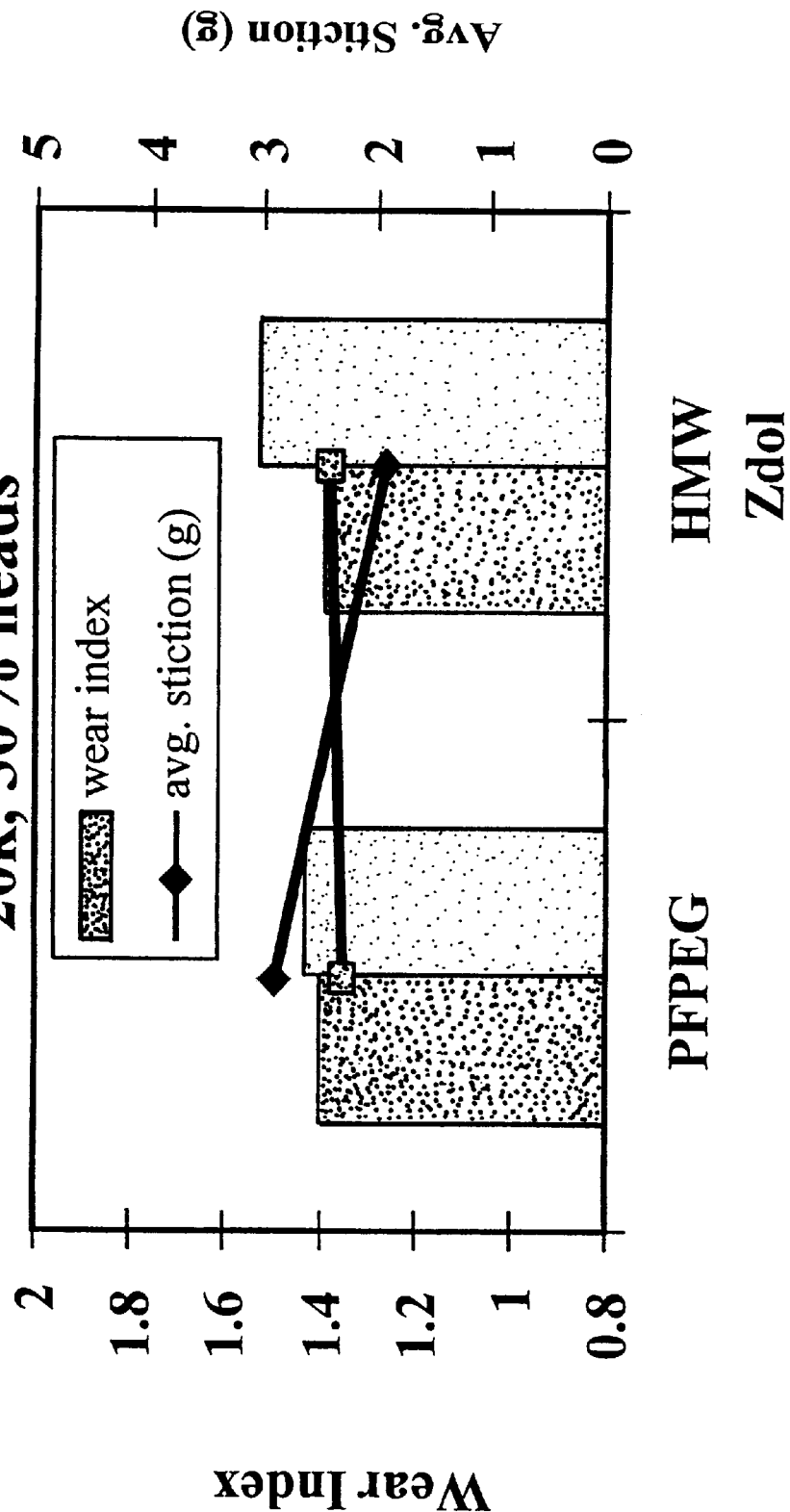

Surprisingly, it was found that the lubricants of the present invention, particularly fluoropolyether alcohols having a molecular weight between about 1000 and 5000, can form lubricant topcoats with bonded lube ratios in excess of 0.5, at various thicknesses such as about 8 Å to about 25 Å. Moreover, the fluoropolyether alcohol lubricants in accordance with the present invention advantageously enable the use of a markedly lower concentration of the lube for application to form a lubricant topcoat. For example, a solutions of about 0.005% by weight of a fluoropolyether alcohol of the present invention can form a lubricant topcoat of about 25 Å. As shown in FIG. 4, high bonded lube ratios are achieved with embodiments of the present invention vis-à-vis conventional lubricants.

Lubricant topcoats on magnetic recording media formed in accordance with the present invention have been evaluated with respect to fly stiction and SD-CSS performance on thin film and magnetic recording disks, with results as good or better than lubricants in current use, such as HMW Zdol (Ausimont USA), as seen in FIGS. 5 through 8.

The lubricants of the present invention characteristically form a uniformly bonded topcoat at an extremely high bonded lube ratio. In view of such a high bonded lube ratio, under certain circumstances it is advantageous to apply an optional thin mobile lube layer, e.g., about 1 Å to about 15 Å, to the bonded lubricant topcoat to further enhance stiction and wear performance. Magnetic recording media produced in accordance with the present invention exhibit low static friction and increased durability during CSS testing.

The inventive lubricant can be prepared by fluorinating a hydrocarbon polyether having at least one terminal hydroxyl group and comprising at least five alkyl ether repeating units, wherein each repeating unit comprises between two to ten carbon atoms. The first step comprises protecting the hydrocarbon polyether by reacting it with a carboxylic acid chloride, such as acetyl chloride, to generate a polyether ester. Furthermore, a polyether diester can be prepared from a hydrocarbon polyether diol.

As one having ordinary skill in the art would recognize, any polyether alcohol or diol can be employed in the practice of the present invention. Indeed, the polyether alcohol in the above reaction may be of any type, including polyalkylene glycols, such as polyethylene, polypropylene glycol, polybutylene glycol, polytetrahydrofuran, or polyepichlorohydrin. Furthermore, the polyalkylether alcohol may be a random polymer or block polymer comprising two or more of the of the polyalkylene glycols.

The subsequent step comprises exposing the polyether ester or diester to fluorine gas for a sufficient time and in a sufficient amount of fluorine gas to fluorinate the polyether ester to generate a fluoropolyether ester or diester.

It should be apparent to one skilled in the subject art that the length of exposure and the amount of fluorine will determine the extent of fluorination of the polyether ester. Thus, a partially fluorinated or completely fluorinated polyether ester may be prepared, as by conventional fluorination techniques, such as those disclosed in U.S. Pat. Nos. 5,539, 059 and 5,506,309. The entire disclosures which are hereby incorporated herein in their entirety by reference.

The fluoropolyether thus formed is then reacted with methanol to generate the more stable methylester. The methyl ester is then reduced with a reducing agent, such as lithium aluminum hydride, to generate a fluoropolyether alcohol product. Preferably, the fluoropolyether has a low polydispersity index of less than about 1.2, more preferably less than about 1.1. A low polydispersity index may be achieved to some degree by selecting the initial hydrocarbon polyether alcohol with a low polydispersity or alternatively, by fractionating the product. Such fractionation steps comprise distillation or chromatography.

EXAMPLE 1

A diacetate ester of poly(ethylene glycol) having an average molecular weight of 1000 is prepared by slowly adding 2.5 moles of acetyl chloride to 1 mole of poly (ethylene glycol) having an average molecular weight of 1000 in a stirred 2-liter flask. Upon addition of the acetyl chloride, the reaction mixture is heated to 50° C. and held at that temperature for 24 hours. Dry nitrogen is bubbled through the flask for 24 hours to remove the resulting hydrogen chloride.

A 10 liter stirred tank reactor is loaded with 5.4 liters of 1,1,2-trichlorotrifluoroethane and 1415 g of finely ground sodium fluoride powder. The reactor is positioned in a constant temperature bath which maintained a reactor temperature of −7° C. A condenser, which is placed downstream from the reactor, is used to condense and return to the reactor any liquid vapor which may be in the gas exit line. The condenser is maintained at −35° C. A mixture consisting of 0.25 moles of a poly(ethylene glycol) diacetate having an average molecular weight of 1000, 320 g of 1,1,2-trichlorotrifluoroethane and 113 g of chloroform (used to solubilize the polyether in the 1,1,2-trichlorotrifluoroethane) is slowly metered into the fluorination reactor over a 26 hour period. Fluorine gas, diluted with nitrogen to give a concentration of 20%, is bubbled through the vigorously stirred fluorination liquid at a rate 10 to 15% higher than that required to theoretically replace all of the hydrogen on the hydrocarbon being pumped into the reactor. Following the reaction, the reactor is purged with several volumes of nitrogen to remove the unreacted fluorine gas. Next, 154 g methanol is pumped into the reactor to give the hydrolytically more stable dimethyl ester. The product is filtered to remove the sodium fluoride and sodium bifluoride solids. The product is separated from the 1,1,2-trichlorotrifluoroethane and methanol by distillation.

The above product is reduced with lithium aluminum hydride in tetrahydrofuran to give the expected methylol derivative having the formula:

$HOCH_2CF_2O(CF_2CF_2O)_nCF_2CH_2OH.$

Figure 2:
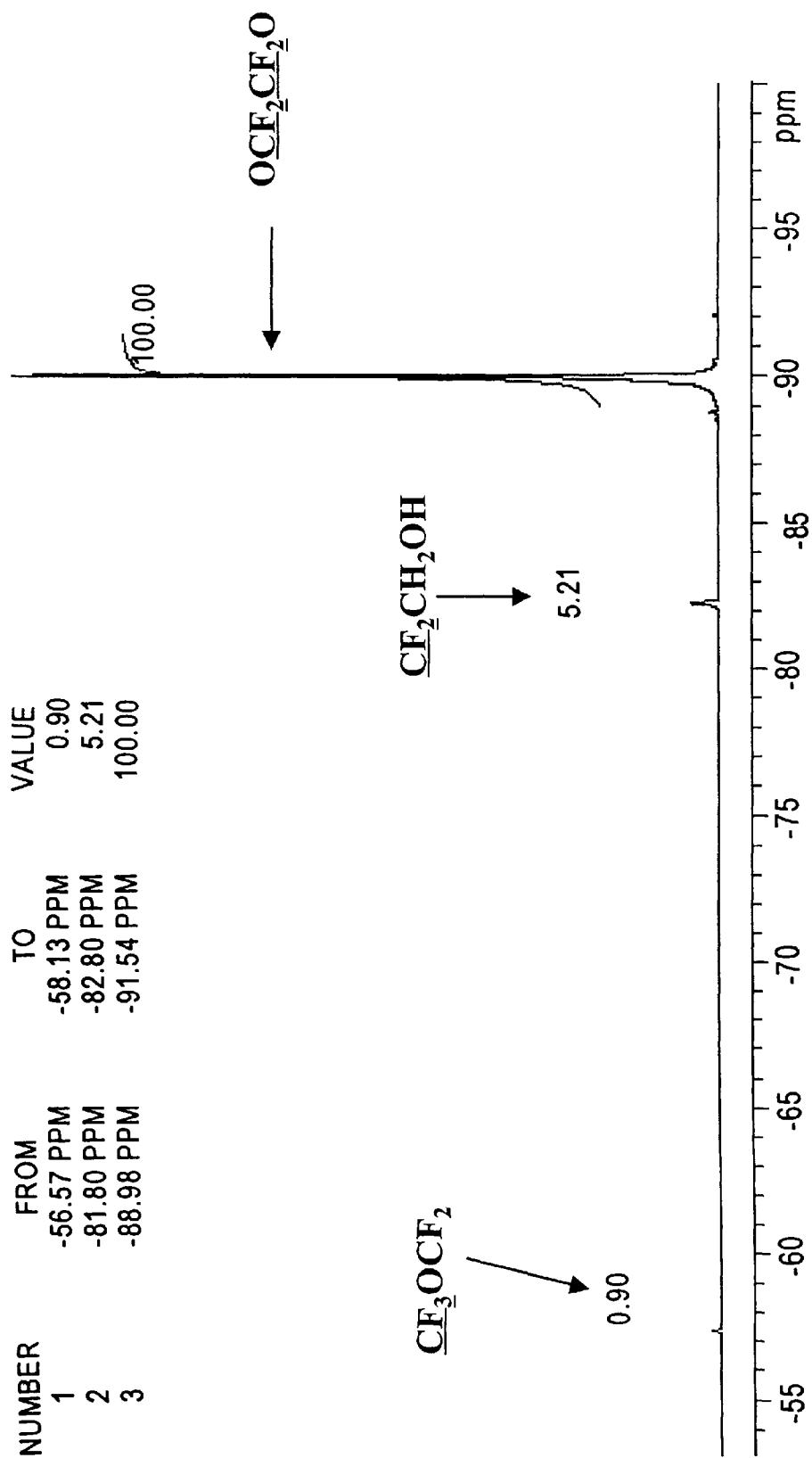
FIG. 2 represents an $^{19}$F NMR spectrum of a fluoropolyether alcohol in accordance with an embodiment of the present invention
Figure 3:
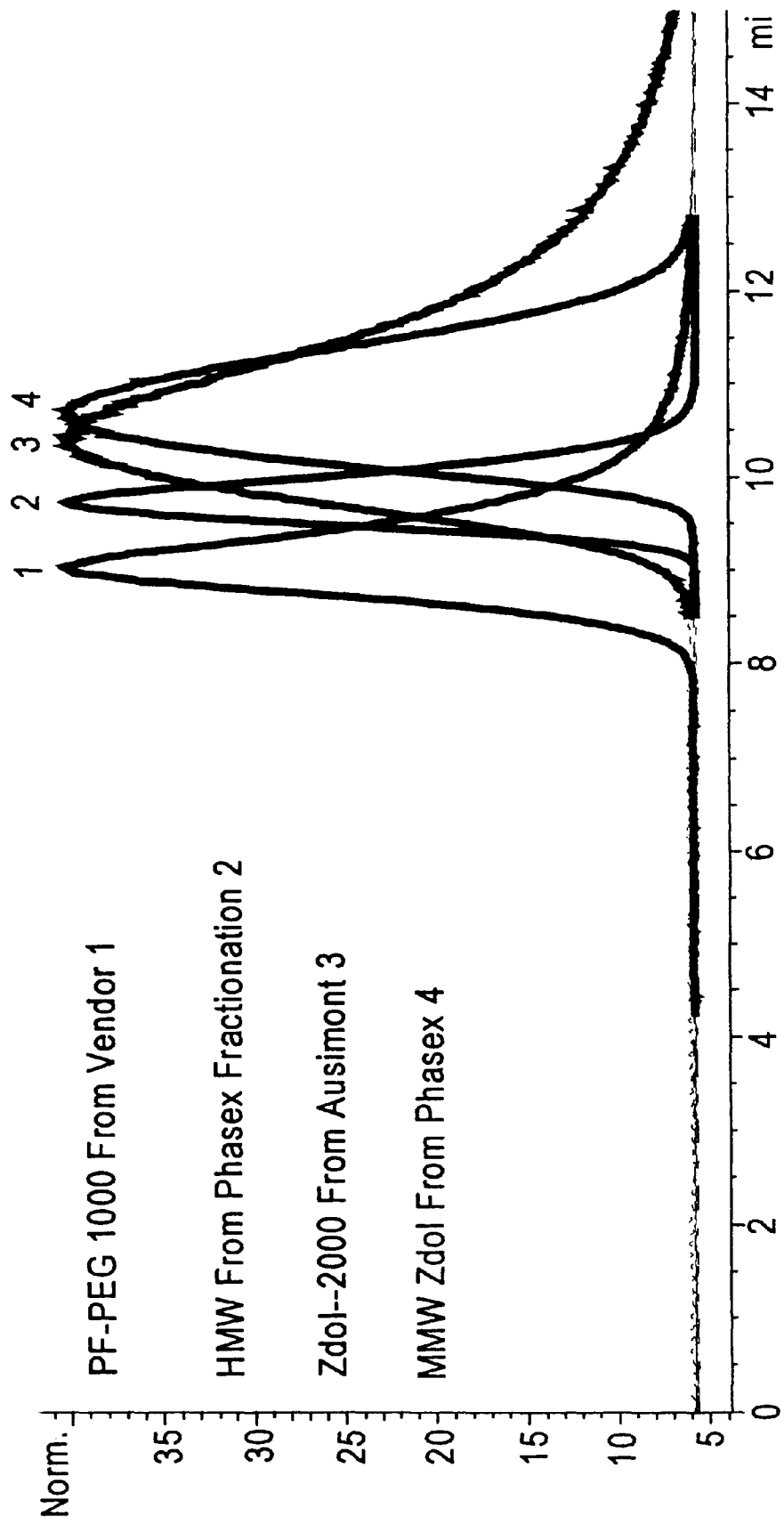
FIG. 3 represents comparative GPC data of an embodiment of the present invention vis-à-vis a commercial product.

FIG. 2 depicts the $^{19}F$ NMR spectra of the product of this reaction.

EXAMPLE 2

A lubricant solution for forming a lubricant topcoat on a magnetic recording medium is formed by simply dissolving a Fluoropolyether alcohol, produced in accordance with the present invention, in a hydrofluorocarbon to produce a solution. For example, the fluoropolyether alcohol of Example 1 is dissolved in PF-5060 to form a solution of 0.005% by weight of fluoropolyether alcohol.

EXAMPLE 3

Advantageously, the lubricant solutions prepared in accordance with the present invention can easily be applied to a magnetic recording medium as, for example, to form lubricant topcoat 14 in the magnetic recording medium depicted in FIG. 1. In accordance with the present invention, the lubricant topcoat can be advantageously applied by submerging a disk in the lubricant solution for a sufficient period of time to form a lubricant topcoat on the disk and removing excess lubricant, as by hand wiping. Elevated temperatures are not necessary. However, it has been found convenient to apply the lubricant topcoat at an elevated temperature.

EXAMPLE 4

As previously disclosed, the lubricant solution in accordance with the present invention can be applied at elevated temperatures by hand wiping or mechanical wiping techniques after immersing a disk in a lubricant solution. A disk ready for application of a lubricant topcoat is soaked in the lubricant solution, removed from the solution and hand or machine wiped, as with a clean cotton wipe. In this manner, a lubricant thickness ranging from about 10 Å to about 10 Å can be obtained depending upon the formulation and wipe procedure.

The present invention is not limited to any particular type of magnetic recording medium, but can be employed in any of various magnetic recording media, including those wherein the substrate or a subsequently deposited layer has been textured, as by mechanical treatment or laser techniques, and the textured surface substantially reproduced on subsequently deposited layers. Thus, a lubricant prepared in accordance with the present invention, can be applied to form a topcoat, such as topcoat 14 on the magnetic recording media depicted in FIG. 1, but not necessarily limited thereto.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A magnetic recording medium comprising a lubricant topcoat, wherein the lubricant is a fluoropolyether alcohol having more than one carbon atom per repeating unit, and wherein the fluoropolyether alcohol has the formula:

$HOCH_2CF_2O(R^1O)_xA;$ wherein
$R^1$ is $—CF_2CF_2—$;
A is H, $—CF_2CH_2OH$, or $—CF_2COOCH_3$; and
X is between 5 to about 500.

2. A magnetic recording medium according to claim 1, wherein the fluoropolyether alcohol is a fluoropolyether diol.

3. The magnetic recording medium according to claim 1, wherein the fluoropolyether alcohol has a polydispersity index of less than about 1.2.

4. The magnetic recording medium according to claim 1, wherein the fluoropolyether alcohol has a polydispersity index of less than about 1.1.

5. The magnetic recording medium according to claim 1, comprising:
a substrate;
a magnetic layer on the substrate; and
the lubricant topcoat on the magnetic layer.

6. The magnetic recording medium according to claim 5, further comprising:

an underlayer on the substrate and the magnetic layer on the underlayer.

7. The magnetic recording medium according to claim 6, further comprising a protective overcoat on the magnetic layer and the lubricant topcoat on the protective overcoat.

8. A magnetic recording medium comprising a lubricant topcoat, wherein the lubricant is a fluoropolyether alcohol having more than one carbon atom per repeating unit, and wherein the fluoropolyether alcohol has the structure:

$$HOCH_2CF_2O(CF_2CF_2O)_nCF_2CH_2OH$$

wherein n is about 10 to about 100.

* * * * *